United States Patent Office 3,334,097
Patented Aug. 1, 1967

---

3,334,097
3 - AMINO - 2 - (2 - OXAZOLIN - 2 - YL)BENZO[f] QUINOXALINES, INTERMEDIATES THEREFOR AND DERIVATIVES THEREOF
Arthur A. Santilli, Ardmore, and Thomas S. Osdene, Berwyn, Pa., assignors to American Home Products Corporation, New York, N.Y., a corporation of Delaware
No Drawing. Filed Feb. 23, 1965, Ser. No. 434,651
15 Claims. (Cl. 260—247.5)

This application is a continuation-in-part of our application Ser. No. 318,823, which was filed on Oct. 25, 1963, and is now abandoned.

The invention herein disclosed is concerned with compositions of matter classified in the art of chemistry as benzoquinoxalinoxazolines, to intermediates used in their preparation, to derivatives thereof, and to processes for making these compounds.

The invention sought to be patented, in its principal composition aspect, resides in the concept of 3-amino-2-(2-oxazolin-2-yl)benzo[f]quinoxalines.

A second composition aspect of the present invention resides in the concept of chemical compounds which have a 3-aminobenzo[f]quinoxaline-2-carboxamide nucleus in which there is attached to the nitrogen of the carboxamide group an ethyl radical bearing in the 2-position thereof a substituent susceptible to nucleophilic displacement.

The invention sought to be patented, in its process aspect, resides in the concept of the sequence of reactions including: forming a 2-cyano-N-(2-hydroxyethyl)acetamide, condensing this acetamide with a 1-nitroso-2-naphthylamine to form a 3-amino-(2-hydroxyethyl)benzo[f]quinoxaline-2-carboxamide; reacting this product with thionyl chloride to form the corresponding 3-amino-(2-chloroethyl)benzo[f]quinoxaline-2-carboxamide, and cyclizing to form a 3-amino-2-(2-oxazolin-2-yl)benzo[f]quinoxaline.

The tangible embodiments of the principal composition aspect of this invention possess the inherent physical properties of being relatively high melting yellow solids, are substantially insoluble in water and are generally soluble in polar solvents such as lower aliphatic alcohols. Examination of compounds produced according to the hereinafter described process reveals data confirming the molecular structure hereinbefore set forth.

The tangible embodiments of the principal composition aspect of the invention possess the inherent applied use characteristic of exerting qualitatively varying therapeutic effects as evidenced by pharmacological evaluation according to standard test procedures. These tangible embodiments show anticonvulsant and hypotensive properties.

The tangible embodiments of the second composition aspect of the invention possess the inherent physical properties of being yellowish solids, are substantially insoluble in water and are generally soluble in polar solvents such as lower aliphatic alcohols.

The tangible embodiments of the second composition aspect of the invention possess the inherent applied use characteristic of being suitable as intermediates in the production of the principle composition aspect of the invention and of exerting qualitatively varying therapeutic effects in experimental animals as evidenced by pharmacological evaluation according to standard test procedures. These tangible embodiments show hypotensive, antibacterial and antitremorine activity.

The manner and process of making and using the invention will now be generally described so as to enable a person skilled in the art of chemistry to make and use the same as follows:

The new processes of this invention are illustrated schematically for a specific embodiment in Scheme A, below, and more generally in Scheme B, to which the numerals in parenthesis in the following description refer.

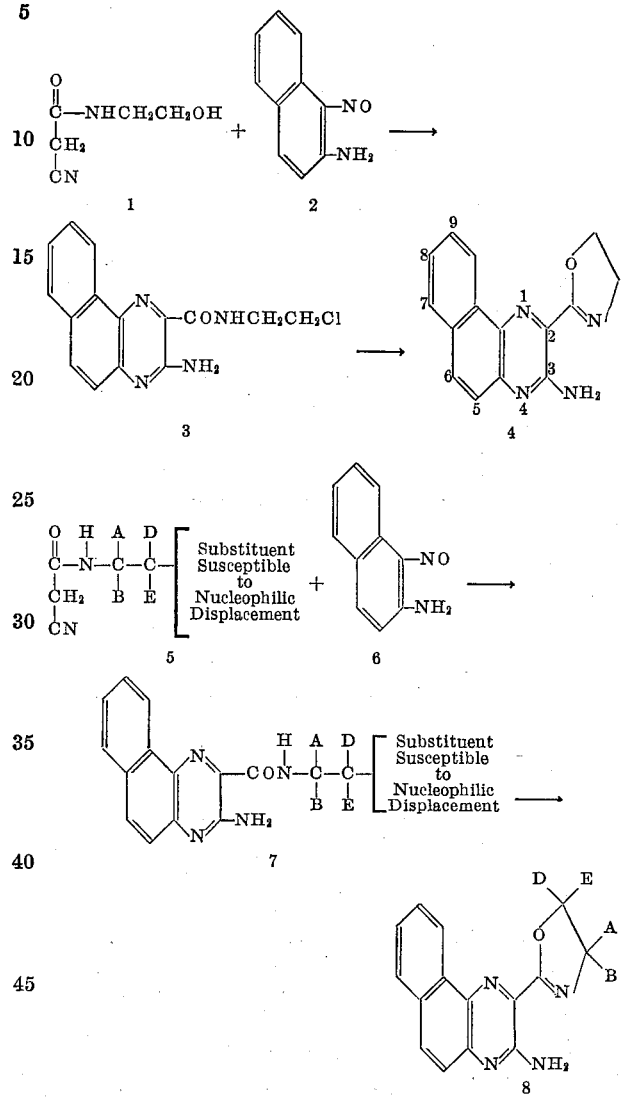

The 3-amino-N-(2-chloroethyl)benzo[f]quinoxaline-2-carboxamide starting material (3) (7) can be prepared according to the following general procedure which involves condensing in a lower alkanol solvent under anhydrous conditions a 1-nitroso-2-naphthylamine (2) (6) with a 2-cyano-N-(2-hydroxyethyl)acetamide (1) (5) in the presence of a catalytic amount of a basic catalyst such as sodium metal, yielding the 3-amino-N-(2-hydroxyethyl)benzo[f]quinoxaline - 2-carboxamide, which compound is then heated with thionyl chloride yielding the 3-amino - N - (2-chloroethyl)benzo[f]quinoxaline-2-carboxamide (3) (7). This product is filtered and dissolved in a solvent such as dimethylformamide or dimethylacetamide. A small amount of an anhydrous alkali metal carbonate, preferably sodium carbonate, is added to the solution. The reaction mixture is refluxed for about an hour and filtered. Cooling the filtrate causes the 3-amino-2-(2-oxazolin-2-yl)benzo[f]quinoxaline (4) (8) to precipitate.

The 1-nitroso-2-naphthylamines and the 2-cyano-N-(2-hydroxyethyl)acetamides employed in making the starting products in our process are generally known or are readily prepared by procedures known to those skilled in the art. The preferred synthesis for certain of the 2-cyano-N-(2-hydroxyethyl)acetamides is given hereinafter in the examples.

It will be apparent from the disclosure herein to those skilled in the art of chemistry that the condensation reaction occuring in the process aspect of this invention can be carried out with any 2-cyano-N-(2-substituted ethyl) acetamide as long as the substituent on the 2-position of the ethyl radical is susceptible to nucleophilic displacement. Among such substituents, and without limiting the generality of the foregoing, are the chlorine, bromine, and iodine atoms, and the tosyl group. Similarly, said acetamides can have on the carbon atom substituents adjacent to the nitrogen atom, (Scheme B, A and B), such as for example but without limitation, (lower)alkyl, (lower)alkylphenyl, halo(lower)alkyl, hydroxyalkyl, aminoalkyl, di(lower)alkylamino (lower)alkyl. Furthermore, the carbon atom bearing the substituent susceptible to nucleophilic displacement can bear instead of hydrogen atoms one or more (lower)alkyl groups, (lower)alkylphenyl groups or cycloalkyl groups such as for example but without limitation, cyclopropyl, cyclobutyl, cyclopentyl and cyclohexyl (Scheme B, D and E).

It will also be apparent to those skilled in the art to which this invention appertains that the aforesaid condensation reaction can be carried out with any 1-nitroso-2-naphthylamine.

When the starting compounds are substituted as hereinbefore recited, it will be apparent to those skilled in the art that the intermediate 3-amino-2-(substituted-ethyl)-benzo[f]quinoxaline-2-carboxamides and the final products formed by the process of the invention will bear, correspondingly, the same substituents. Such substituted compounds are the full equivalents of the invention as particularly claimed.

Other alternative methods of producing the claimed compounds can be employed. Thus, the aforementioned 3-amino - (2 - hydroxyethyl)benzo[f]quinoxaline-2-carboxamide can be converted to its corresponding alkylsulfonyl or substituted benzenesulfonyl ester by treatment with an alkylsulfonyl halide or a substituted benzenesulfonyl halide in an inert solvent. Cyclization of the ester can be effected by heating it with an alkali metal carbonate to form a 3-amino-2-(2-oxazolin-2-yl)benzo-[f]quinoxaline.

Similarly, a 3 - amino-2-(4-chloroalkyl-2-oxazolinyl-2-yl)benzo[f]quinoxaline, prepared in accordance with the first method above-indicated, can be treated with a heterocyclic amine such as morpholine to form the product, 3-amino-2-(4-morpholinoalkyl - 2 - oxazolin-2-yl)benzo-[f]quinoxaline.

We have also made the compositions constituting the invention with certain substituents other than hereinbefore enumerated added to the nucleus of the claimed compounds and have determined by pharmacological evaluation that the toxicities of and the activities of the compositions so modified are not materially affected. Thus, it will be apparent from the disclosure herein to those skilled in the art of organic chemistry that certain of the carbon atoms of the naphthalene ring system can have on any convenient position one or more simple substituents which are inert to the reactions herein described, such as, for example but without limitation, (lower)alkyl, i.e., methyl, ethyl, propyl, pentyl and hexyl, nitro, (lower)alkoxy, i.e., methoxy, ethoxy, propoxy, butoxy and pentoxy; sulfonamido and halogen. The oxygen atom in the oxazoline ring can be replaced in a well-known manner by a sulfur atom. Such variations in the molecular structure of the composition aspects as hereinbefore described are considered as equivalents of the subject matter sought to be patented.

The best mode contemplated by the inventors of carrying out their invention will now be set forth as follows:

*Example 1.—Preparation of 3-amino-2-(2-oxazolin-2-yl)-benzo[f]quinoxaline*

A. PREPARATION OF STARTING PRODUCTS (1) Add to a solution of 0.97 g. of sodium metal in 200 ml. of absolute ethanol, 6.9 g. of 1-nitroso-2-naphthylamine and 5.4 g. of 2-cyano-N-(2-hydroxyethyl)acetamide. Boil the reaction mixture for ½-hour and then cool in ice to deposit a crystalline product out of solution (7.45 g.) M.P. 160–164°. Recrystallize the product from ethanol to afford 3-amino-N-(2-hydroxyethyl)-benzo[f]quinoxaline-2-carboxamide, M.P. 181–182°.

(2) Boil a solution of 0.5 g. of 3-amino-N-(2-hydroxyethyl)[f]quinoxaline-2-carboxamide in 15 ml. of thionyl chloride under reflux for 1 hour. Remove the excess thionyl chloride in vacuo on a rotary evaporator. Add twenty-five milliliters of water to the residue. Remove the solid product by filtration (0.4 g.), M.P. 230–233°. Recrystallize from benzene to afford 3-amino-N-(2-chloroethyl)benzo[f]quinoxaline-2-carboxamide, M.P. 231.5–232.5°.

B. PREPARATION OF 3-AMINO-2-(2-OXAZOLIN-2-YL) BENZO[f]QUINOXALINE

Add 1 g. of anhydrous powdered sodium carbonate to a solution of 2 g. of 3-amino-N-(2-chloroethyl)benzo[f]quinoxaline-2-carboxamide in 30 ml. of dimethylformamide. Boil the reaction mixture under reflux for 1 hour and then filter. Allow a yellow crystalline product to deposit out of solution upon cooling the filtrate in ice (1.55 g.), M.P. 258–260°. Recrystallize from ethanolic dimethylformamide to afford 3-amino-2-(2-oxazolin-2-yl) benzo[f]quinoxaline, M.P. 258–260°. This compound has hypotensive activity, as determined by standard experimental procedures.

The following examples illustrate additional alternative methods for preparing the preferred embodiment set forth in Example 1 and other compositions of the invention. All temperatures are given in degrees centigrade.

*Example 2.—3-amino-2-(2-oxazolin-2-yl)benzo[f] quinoxaline*

Add 1.9 g. of p-toluenesulfonyl chloride to a solution of 2.82 g. of 3-amino-N-(2-hydroxyethyl)benzo[f]quinoxaline-2-carboxamide in 35 ml. of dry pyridine. Allow to stand at room temperature for 4 hours. Add 150 ml. of water to the reaction mixture. Allow a yellow crystalline product to deposit out of solution (3.3 g.), M.P. 159–168°. Recrystallize the product from toluene to afford 3 - amino - N - (2 - hydroxyethyl)benzo[f]quinoxaline-2-carboxamide, p-toluenesulfonate ester, M.P. 160–162°.

Add to a solution of 1 g. of 3-amino-N-(2-hydroxyethyl)benzo[f]quinoxaline - 2 - carboxamide, p - toluenesulfonate ester in 35 ml. of dimethylformamide, 1 g. of powdered anhydrous sodium carbonate. Boil the reaction mixture under reflux for 1 hr. and then filter. Cool the solution to obtain a product (.35 g.) identical to the product made in Example 1, since a mixture of the two samples gives no melting point depression.

*Example 3.—2-cyano-N-[1-(hydroxymethyl)propyl] acetamide*

Heat a solution containing 17.8 g. of 2-amino-1-butanol and 22.6 g. of ethyl cyanoacetate in 100 ml. of absolute ethanol under reflux for 2 hours. Remove the solvent on a rotary evaporator. Allow the residue to stand overnight to crystallize a solid (28.5 g.), M.P. 72–78°. Recrystallize this product from ethyl acetate-petroleum ether to give 2 - cyano - N - [1 - (hydroxymethyl)propyl]acetamide, M.P. 87–88°.

*Example 4.—2-cyano-N-(1,1-dimethyl-2-hydroxyethyl) acetamide*

Boil a solution containing 17.8 g. of 2-amino-2-methyl-1-propanol and 22.6 g. of ethyl cyanoacetate in 100 ml. of absolute ethanol under reflux for 2 hours. Remove the ethanol on a rotary evaporator. Allow the residual oil to crystallize on standing to a solid (32.1 g.), M.P. 44–54°. Recrystallize the product from ethyl acetate-petroleum ether to give 2-cyano-N-(1,1-dimethyl-2-hydroxyethyl)acetamide, M.P. 68–70°.

*Example 5.—2-cyano-N-[1,1-bis(hydroxymethyl)ethyl] acetamide*

Boil a solution containing 10.5 g. of 2-amino-2-methyl-1,3-propanediol and 11.3 g. of ethyl cyanoacetate in 50 ml. of absolute ethanol under reflux for 1 hour. Remove the solvent on a rotary evaporator to obtain a residual solid (21 g.), M.P. 127–130°. Recrystallize the product from ethyl acetate-ethanol to afford 2-cyano-N-[1,1-bis(hydroxymethyl)ethyl]acetamide, M.P. 130.5–131.5°.

*Example 6.—2-cyano-N-(2-hydroxypropyl)acetamide*

React 22.5 g. of 1-amino-2-propanol and 33.9 g. of ethyl cyanoacetate as in Example 1 to obtain 2-cyano-N-(2-hydroxypropyl)acetamide.

*Example 7.—3-amino-N-(2-hydroxyethyl)benzo[f] quinoxaline-2-carboxamide*

Add to a solution of 0.97 g. of sodium metal in 200 ml. of absolute ethanol 6.9 g. of 1-nitroso-2-naphthylamine and 5.4 g. of 2-cyano-N-(2-hydroxyethyl)acetamide. Boil the reaction mixture for ½-hour and then cool in ice to deposit a crystalline product out of solution (7.45 g.), M.P. 160–164°. Recrystallize the product from ethanol to afford 3-amino-N-(2-hydroxyethyl)benzo[f]quinoxaline-2-carboxamide, M.P. 181–182°.

*Example 8.—3-amino-N-[1-(hydroxymethyl)propyl] benzo[f]quinoxaline-2-carboxamide*

Add 6.9 g. of 1-nitroso-2-naphthylamine and 6.56 g. of 2-cyano-N-[1-(hydroxymethyl)propyl]acetamide to a solution of 0.92 g. of sodium metal in 200 ml. of absolute ethanol. After boiling the reaction mixture under reflux for ½-hour and cooling in ice, collect a crystalline product (8.9 g.) M.P. 210–213°. Recrystallize from ethanol to afford 3-amino-N-[1-(hydroxymethyl)propyl]benzo[f]quinoxaline-2-carboxamide, M.P. 212–213.5°.

*Example 9.—3-amino-N-(1,1-dimethyl-2-hydroxyethyl) benzo[f]quinoxaline-2-carboxamide*

Add 6.9 g. of 1-nitroso-2-naphthylamine and 6.56 g. of 2-cyano-N-(1,1-dimethyl-2-hydroxyethyl)acetamide to a solution of 0.92 g. of sodium metal in 200 ml. of absolute ethanol. Boil the reaction mixture under reflux for ½-hour. Remove the solvent on a rotary evaporator. Acidify the residual solid with glacial acetic acid to obtain a solid residue (9.7 g.), M.P. 140–142°. Recrystallize the product from ethanol to afford 3-amino-N-(1,1-dimethyl-2-hydroxyethyl)benzo[f]quinoxaline-2-carboxamide, M.P. 200–203°.

*Example 10.—3-amino-N-[1,1-bis(hydroxymethyl)ethyl] benzo[f]quinoxaline-2-carboxamide*

Add 6.9 g. of 1-nitroso-2-naphthylamine and 7.4 g. of 2-cyano-N-[1,1-bis(hydroxymethyl)ethyl]acetamide to a solution of 0.92 g. of sodium metal dissolved in 200 ml. of absolute ethanol. Boil the reaction mixture under reflux for 35 minutes to deposit a yellowish-brown solid (6.5 g.). Obtain an additional 3.2 g. of solid from the filtrate after removal of the solvent on the rotary evaporator. Combine the solids and acidify with glacial acetic acid. After acidification, extract the solid product with benzene in a Soxhlet extractor, to obtain 7 g. of solid after removal of the solvent. Recrystallize from aqueous dimethylformamide to obtain 3-amino-N-[1,1-bis(hydroxymethyl)ethyl]benzo[f]quinoxaline-2-carboxamide, M.P. 218–219.5°.

*Example 11.—3-amino-N-(2-hydroxypropyl)benzo[f] quinoxaline-2-carboxamide*

Add 6.9 g. of 1-nitroso-2-naphthylamine and 5.9 g. of 2-cyano-N-(2-hydroxypropyl)acetamide (from Example 6) to a solution of 0.92 g. of sodium metal dissolved in 200 ml. of absolute ethanol. Boil the reaction mixture under reflux for ½-hour and cool in ice to obtain a yellow solid material out of solution. Remove the solid by filtration (6.5 g.), M.P. 178–180°. Recrystallize from benzene to afford 3-amino-N-(2-hydroxypropyl)benzo[f]quinoxaline-2-carboxamide, M.P. 182–183°.

*Example 12.—3-amino-N-[1-(chloromethyl)propyl] benzo[f]quinoxaline-2-carboxamide*

Boil a solution of 7.1 g. of 3-amino-N-[1-(hydroxymethyl)propyl]benzo[f]quinoxaline-2-carboxamide in 60 ml. of thionyl chloride under reflux for 1 hour. Remove the excess thionyl chloride on a rotary evaporator. Make basic the solid residue with 6 N ammonium hydroxide solution and collect the residue (7.2 g.), M.P. 200–205°. Recrystallize from xylene to afford 3-amino-N-[1-(chloromethyl)propyl]benzo[f]quinoxaline-2-carboxamide, M.P. 211–212°.

*Example 13.—3-amino-N-(1,1-dimethyl-2-chloroethyl) benzo[f]quinoxaline-2-carboxamide*

React 7 g. of 3-amino-N-(1,1-dimethyl-2-hydroxyethyl)benzo[f]quinoxaline-2-carboxamide and 60 ml. of thionyl chloride as in Example 12 to afford 3-amino-N-(1,1-dimethyl-2-chloroethyl)benzo[f]quinoxaline-2-carboxamide.

*Example 14.—3-amino-N-[1,1-bis(chloromethyl)ethyl] benzo[f]quinoxaline-2-carboxamide*

Boil a solution of 10 g. of 3-amino-N-[1,1-bis(hydroxymethyl)ethyl]benzo[f]quinoxaline-2-carboxamide in 100 ml. of thionyl chloride under reflux for 2 hours. Remove the excess thionyl chloride in vacuo on a rotary evaporator. Remove the solid residue, after treatment with ice, by filtration and wash with 10% sodium carbonate solution and then with water to obtain the product (7.9 g.), M.P. 176–189°. Recrystallize from benzene to afford 3-amino-N-[1,1-bis(chloromethyl)ethyl]benzo[f]quinoxaline-2-carboxamide, M.P. 183–184°.

*Example 15.—3-amino-N-(2-chloropropyl)benzo[f] quinoxaline-2-carboxamide*

Boil a solution of 1 g. of 3-amino-N-(2-hydroxypropyl)benzo[f]quinoxaline-2-carboxamide in 10 ml. of thionyl chloride under reflux for 1 hour. Remove the excess thionyl chloride in vacuo on a rotary evaporator. Wash the gummy residue with 10% sodium carbonate solution and with water to afford the product (1.2 g.), M.P. 210–220°. Recrystallize from cyclohexane to afford 3-amino-N-(2-chloropropyl)benzo[f]quinoxaline-2-carboxamide, M.P. 214–215°.

*Example 16.—3-amino-2-(4-ethyl-2-oxazolin-2-yl)benzo [f]quinoxaline*

Add 0.5 g. of powdered anhydrous sodium carbonate to a solution of 0.5 g. of 3-amino-N-[1-(chloromethyl)propyl]benzo[f]quinoxaline-2-carboxamide in 15 ml. of dimethylformamide. Boil the reaction mixture under reflux for 2 hours and then filter. Add water to the filtrate to deposit a yellow solid out of solution (0.4 g.), M.P. 167–170°. Recrystallize from aqueous dimethylformamide to afford 3-amino-2-(4-ethyl-2-oxazolin-2-yl)benzo[f]quinoxaline, M.P. 168–170°.

*Example 17.—3-amino-2-(4,4-dimethyl-2-oxazolin-2-yl) benzo[f]quinoxaline*

Add 5 g. of powdered anhydrous sodium carbonate to a solution of 3.3 g. of 3-amino-N-(1,1-dimethyl-2-chloroethyl)benzo[f]quinoxaline-2-carboxamide (prepared in Example 13) in 30 ml. of dimethylformamide. Heat the reaction mixture under reflux for 1 hour and then filter. Add water to the filtrate, causing a solid to be deposited out of solution (3 g.), M.P. 182–192°. Recrystallize from aqueous methanol to afford 3-amino-2-(4,4-dimethyl-2-oxazolin-2-yl)benzo[f]quinoxaline, M.P. 200–205°.

*Example 18.—3-amino-2-(4-chloromethyl-4-methyl-2-oxazolin-2-yl)benzo[f]quinoxaline*

Add 1.5 g. of powdered anhydrous sodium carbonate to a solution of 3 g. of 3-amino-N-[1,1-bis(chloromethyl)ethyl]benzo[f]quinoxaline-2-carboxamide in 20 ml. of dimethylformamide. Boil the reaction mixture under reflux for 1 hour and then filter. Add water to the filtrate to obtain a precipitate (3.9 g.), M.P. 212–214°. Recrystallize from benzene to afford 3-amino-2-(4-chloromethyl-4-methyl-2-oxazolin-2-yl)benzo[f]quinoxaline, M.P. 215–216°.

*Example 19.—3-amino-2-(4-methyl-4-morpholinomethyl-2-oxazolin-2-yl)benzo[f]quinoxaline*

Boil a solution of 3 g. of 3-amino-2-(4-chloromethyl-4-methyl-2-oxazolin-2-yl)benzo[f]quinoxaline in 30 ml. of morpholine under reflux for 24 hours. Allow to cool to room temperature. Add water to cause a solid to precipitate (3 g.), M.P. 192–193°. Recrystallize from benzene to afford 3-amino-2-(4-methyl-4-morpholinomethyl-2-oxazolin-2-yl)benzo[f]quinoxaline, M.P. 192–194°.

*Example 20.—3-amino-2-(5-methyl-2-oxazolin-2-yl)benzo[f]quinoxaline*

React 3 g. of 3-amino-N-(2-chloropropyl)benzo[f]quinoxaline-2-carboxamide in 30 ml. of dimethylformamide in the presence of powdered, anhydrous sodium carbonate as in Example 1 to give 3-amino-2-(5-methyl-2-oxazolin-2-yl)benzo[f]quinoxaline.

*Example 21.—2-cyano-N-(β-hydroxyphenethyl)acetamide*

React 26.6 g. of β-hydroxyphenethylamine and 22.6 g. of ethyl cyanoacetate as in Example 3 to obtain 2-cyano-N-(β-hydroxyphenethyl)acetamide.

*Example 22.—3-amino-N-(β-hydroxyphenethyl)benzo[f]quinoxaline-2-carboxamide*

React 6.9 g. of 1-nitroso-2-naphthylamine and 8.6 g. of 2-cyano-N-(β-hydroxyphenethyl)acetamide as in Example 7 to obtain 3-amino-N-(β-hydroxyphenethyl)benzo[f]quinoxaline-2-carboxamide.

*Example 23.—3-amino-N-(β-chlorophenethyl)benzo[f]quinoxaline-2-carboxamide*

React 7 g. of 3-amino-N-(β-hydroxyphenethyl)benzo[f]quinoxaline-2-carboxamide and 60 ml. of thionyl chloride as in Example 12 to obtain 3-amino-N-(β-chlorophenethyl)benzo[f]quinoxaline-2-carboxamide.

*Example 24.—3-amino-2-(5-phenyl-2-oxazolin-2-yl)benzo[f]quinoxaline*

React 2 g. of 3-amino-N-(β-chlorophenethyl)benzo[f]quinoxaline-2-carboxamide in the presence of 1 g. of sodium carbonate as in Example 16 to obtain 3-amino-2-(5-phenyl-2-oxazolin-2-yl)benzo[f]quinoxaline.

*Example 25.—Preparation of 3-amino-2-(2-thiazolin-2-yl)benzo[f]quinoxaline*

Add 2 g. of phosphorous pentasulfide powder to a solution of 2 g. of 3-amino-2-(2-oxazolin-2-yl)benzo[f]quinoxaline in 30 ml. of dry pyridine. Boil the reaction mixture under reflux for 1¾ hours. Cool to room temperature and add 70 ml. of hot water to the reaction mixture to obtain a solid material (2.5 g.). Recrystallize from aqueous pyridine to afford 3-amino-2-(2-thiazolin-2-yl)benzo[f]quinoxaline, M.P. 254–256°.

The claimed compounds can be formulated for use in the same way as conventional anticonvulsant, antibacterial, antitremorine and hypotensive agents. They can be formulated with the usual excipients into tablets or capsules for oral administration or dissolved under sterile conditions in a physiologically acceptable solvent for parenteral injection.

What is claimed is:
1. A compound of the formula

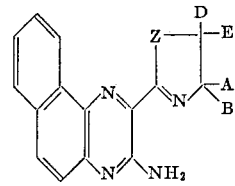

wherein Z is selected from the group consisting of oxy (—O—) and thio (—S—); A and B are each selected from the group consisting of hydrogen, lower alkyl, halo lower alkyl, hydroxy lower alkyl, amino lower alkyl, lower alkyl phenyl and di(lower alkyl)amino lower alkyl, and D and E are each selected from the group consisting of hydrogen, lower alkyl, lower alkyl phenyl and cycloalkyl.

2. 3 - amino - 2 - (2 - oxazolin - 2 - yl)benzo[f]quinoxaline.

3. 3 - amino - 2 - (2 - thiazolin - 2 - yl)benzo[f]quinoxaline.

4. 3 - amino - 2 - (4 - ethyl - 2 - oxazolin - 2 - yl)benzo[f]quinoxaline.

5. 3 - amino - 2 - (4,4 - dimethyl - 2 - oxazolin - 2 - yl)benzo[f]quinoxaline.

6. 3 - amino - 2 - (4 - chloromethyl - 4 - methyl - 2 - oxazolin-2-yl)benzo[f]quinoxaline.

7. 3 - amino - 2 - (4 - methyl - 4 - morpholinomethyl-2-oxazolin-2-yl)benzo[f]quinoxaline.

8. 3 - amino - N - (2 - hydroxyethyl)benzo[f]quinoxaline-2-carboxamide.

9. 3 - amino - N - [1 - (hydroxymethyl)propyl]benzo[f]quinoxaline-2-carboxamide.

10. 3 - amino - N - (2 - hydroxypropyl)benzo[f]quinoxaline-2-carboxamide.

11. 3 - amino - N - (2 - chloroethyl)benzo[f]quinoxaline-2-carboxamide.

12. 3 - amino - N - (2 - hydroxyethyl)benzo[f]quinoxaline-2-carboxamide, p-toluenesulfonate ester.

13. 3 - amino - N - (1,1 - dimethyl - 2 - chloroethyl)benzo[f]quinoxaline-2-carboxamide.

14. 3 - amino - N - [1,1 - bis(chloromethyl)ethyl]benzo[f]quinoxaline-2-carboxamide.

15. 3 - amino - N - (2 - chloropropyl)benzo[f]quinoxaline-2-carboxamide.

References Cited

UNITED STATES PATENTS 3,145,205   8/1964   Osdene _____ 260—250

OTHER REFERENCES

Elderfield, Heterocyclic Compounds, vol. 5 (1957), pages 377–381.

Gould, Mechanism and Structure in Organic Chemistry, Henry Holt, 1959, pp. 261–262.

Migrdichian, Organic Synthesis, vol. I, 1957, pages 19–21.

ALEX MAZEL, *Primary Examiner.*

HENRY R. JILES, *Examiner.*

R. J. GALLAGHER, *Assistant Examiner.*